US007628524B2

(12) United States Patent
Lemay et al.

(10) Patent No.: US 7,628,524 B2
(45) Date of Patent: Dec. 8, 2009

(54) DECORATIONS WITH OPTIC FIBERS

(76) Inventors: Richard Lemay, 3061, des Châtelets, Ste-Foy, (Québec) (CA) G1V 3Y6; Luc Gilbert, 6725, Jurancon, St-Émile (Québec) (CA) G3E 1Y5

( * ) Notice: Subject to any disclaimer, the term of this patent is extended or adjusted under 35 U.S.C. 154(b) by 198 days.

(21) Appl. No.: 11/191,913

(22) Filed: Jul. 29, 2005

(65) Prior Publication Data

US 2007/0025120 A1 Feb. 1, 2007

(51) Int. Cl.
*F21V 8/00* (2006.01)
(52) U.S. Cl. .................... 362/565; 362/554; 428/4; 428/5; D26/27; D26/101
(58) Field of Classification Search ......... 362/565–568, 362/554; 428/4, 5; 385/901; D29/27, 101
See application file for complete search history.

(56) References Cited

U.S. PATENT DOCUMENTS

| D221,868 | S | | 9/1971 | Fairchild et al. |
|---|---|---|---|---|
| 3,624,385 | A | | 11/1971 | Wall |
| 3,727,043 | A | | 4/1973 | Wall |
| 3,881,976 | A | * | 5/1975 | Jones ..................... 362/554 |
| 3,922,407 | A | | 11/1975 | Nimmo et al. |
| 4,201,806 | A | | 5/1980 | Cole |
| 4,895,741 | A | | 1/1990 | Coffman |
| D342,921 | S | | 1/1994 | Cheng |
| D345,021 | S | | 3/1994 | Storey et al. |
| D370,548 | S | | 6/1996 | Cocca et al. |
| 6,174,072 | B1 | | 1/2001 | Root, Jr. |
| 6,568,828 | B2 | | 5/2003 | Rudoy |
| 6,575,585 | B2 | | 6/2003 | Nelson et al. |
| 6,739,745 | B1 | * | 5/2004 | Valdes ..................... 362/565 |
| 7,020,369 | B2 | * | 3/2006 | Lodge et al. ............ 362/565 |
| 2002/0181248 | A1 | | 12/2002 | Cheng |
| 2005/0169011 | A1 | * | 8/2005 | Tsai ..................... 362/565 |

FOREIGN PATENT DOCUMENTS

CA 1268038 4/1990

OTHER PUBLICATIONS

Internet—http://www.artificial-christmas-tree.com 1997-2004.

\* cited by examiner

*Primary Examiner*—Stephen F Husar
(74) *Attorney, Agent, or Firm*—Equinox Protection; Franz Bonsang, Patent Agent

(57) ABSTRACT

The present invention provides an illuminated decorative item, a decorative item made of ribbon and an illumination circuitry for a decorative item made of ribbon. The illuminated decorative item comprises a decorative body created with at least one elongated strip of material, the body having a base; a light source disposed at the base; an energy source electrically connected to the light source to supply energy to the light source; and at least one optic fiber, each optic fiber comprising an elongated body having a base end and a free end, the base end being close to and oriented towards the light source, the free end being arranged to visually complement the decorative body; wherein the energy source supplies energy to the light source, at least some light emitted by the light source enters the optic fiber at the base end, propagates inside the optic fiber, and exits from the free end thus generating an illumination at the free end and creating a illumination effect for the decorative item.

13 Claims, 9 Drawing Sheets

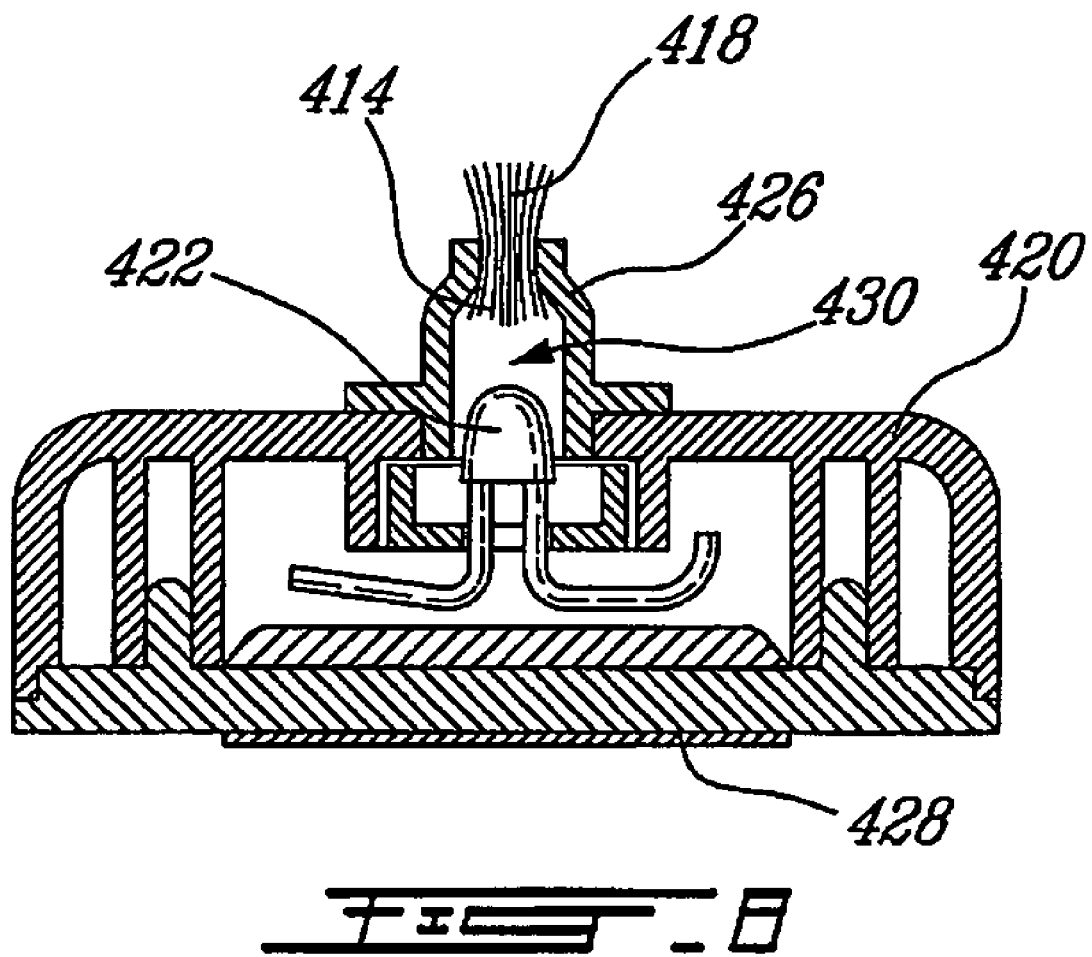

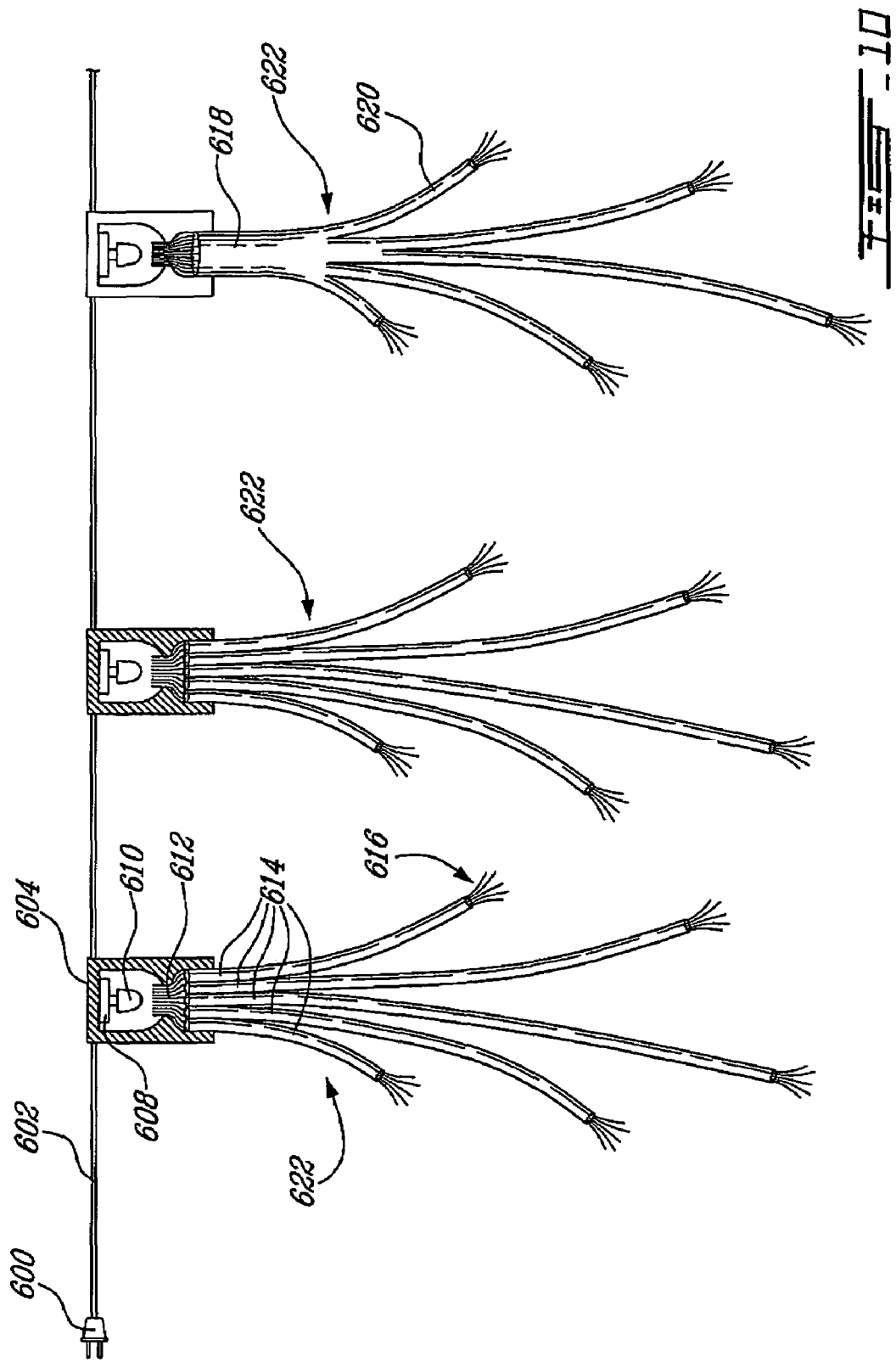

DECORATIONS WITH OPTIC FIBERS

CROSS-REFERENCE TO RELATED APPLICATIONS

The present application claims priority of U.S. Design application No. 29/211,450 filed on Aug. 17, 2004.

BACKGROUND OF THE INVENTION

1) Field of the Invention

The present invention relates to the field of illuminated optic fibers used for decoration.

2) Description of the Prior Art

It is well known in the art that optic fibers are advantageously used in the telecommunications industry to transfer data over long distances. In these applications, photons (making up light) encoded with data are fed into one end of an optic fiber, travel inside the optic fiber and are received at the other end for decoding. One advantage of using fiber optics in telecommunication applications is that optic fibers provide low-loss data transfer, i.e. the signal may travel very long distances with very little attenuation.

An artistic application of optic fiber technology is to use the low-loss light transportation characteristics of the optic fibers in decorations. In this application, light is fed into a first end of the optic fiber, which creates a pinpoint of light at the other end (free end). When using a number of optic fibers, one may create beautiful decorations by the many pinpoints of light generated at the fibers' free end. A good example of this application is the optic fiber Christmas tree available from a plurality of vendors including ASA Information Management. In an optic fiber Christmas tree, the free end of the optical fibers are distributed over the entire tree. The resulting pinpoints of light resemble tiny Christmas lights. The result is beautiful, many will agree, especially when several light sources feed differently colored light to different fibers, and when the light sources vary in light intensity with time. The website http://artificial-christmas-tree.com/ available on Jul. 29, 2005 provides information on a plurality of fiber optic Christmas trees created by ASA Information Management.

Also well known in the art is the tradition of wrapping gifts in beautifully colored paper and to affix a ribbon, a bow and/or a star bow thereto in order to decorate them and to stimulate the imagination of the ones the gifts are destined to. A star bow gives an interesting appearance to a wrapped present due to the way a ribbon is twisted and turned to form it. Sometimes, the ribbon used for the decorative item is made of a light reflecting material so the ribbon appears to sparkle when moved in front of a light source.

Bows and ribbons cannot be seen in the dark. The gift does not seem as attractive when the lights are out during, for example, the traditional "blowing out the candles" moment at a birthday celebration or during Christmas Eve when Santa Claus has just dropped the gifts at the foot of the Christmas tree.

Also well known in the art are icicle lights used to decorate one's home. Hanging from eaves, gutters, railings or fences, these dangling strings shimmer with festivity. The icicle light usually comes in strands eight to twelve feet long. Like normal Christmas lights, they are on one strand, but then off of the strand come evenly spaced "icicles" that look beautiful when hung correctly. The icicle part of the lights hangs freely, but the main strand is affixed to the home. The Christmas lights at the end of the icicles are little bulbs.

There is a need to always go further in the field of decorations, to make a decoration lovelier than what has ever been seen.

SUMMARY OF THE INVENTION

Accordingly, an object of the invention is to combine the beautiful illumination properties of optic fibers to the esthetic appearance of a decoration, such as a ribbon, a bow, a star bow, an icicle light set, etc to create an even lovelier decoration.

It is a further object of the invention to provide a decoration which not only has a beautiful color, but also is illuminated to make a gift or a house look particularly special.

According to a first broad aspect of the invention, there is provided an illuminated decorative item. The item comprises a decorative body created with at least one elongated strip of material, the body having a base; a light source disposed at the base; an energy source electrically connected to the light source to supply energy to the light source; and at least one optic fiber, each optic fiber comprising an elongated body having a base end and a free end, the base end being close to and oriented towards the light source, the free end being arranged to visually complement the decorative body; wherein the energy source supplies energy to the light source, at least some light emitted by the light source enters the optic fiber at the base end, propagates inside the optic fiber, and exits from the free end thus generating an illumination at the free end and creating a illumination effect for the decorative item.

According to another broad aspect of the invention, there is provided a decorative item made of ribbon. The item comprises a decorative body created with at least one piece of the ribbon, the body having a base; at least one optic fiber, each optic fiber comprising an elongated body having a base end and a free end, the base end being close to the base end, the free end being arranged to visually complement the decorative body.

According to still another broad aspect of the invention, there is provided an illumination circuitry for a decorative item made of ribbon. The item has a decorative body created with at least one piece of the ribbon, the body having a base and at least one optic fiber, each optic fiber comprising an elongated body having a base end and a free end, the base end being close to the base end, the free end being arranged to visually complement the decorative body. The illumination circuitry comprises a light source substantially aligned with the base ends; and an energy source electrically connected to the light source to supply energy to the light source; wherein the illumination circuitry is adapted to be disposed at the base thereby ensuring that when the energy source supplies energy to the light source, at least some light emitted by the light source enters the optic fiber at the base end, propagates inside the optic fiber, and exits from the free end thus generating an illumination at the free end and creating a illumination effect for the decorative item.*

A preferred embodiment of the invention presents an optic fiber star bow with optic fiber illumination. The star bow may be made of an opaque ribbon, but may also be made of a transparent or semi-transparent ribbon to enhance the illumination effect. An illumination source, preferably a LED (light-emitting diode), is fixed at the base of the star bow. Optic fibers consisting of an elongated body with two ends, a base end and an free end, are put into contact with the LED illumination at their base end in a way that the light emitted by the LED will enter the optic fiber. The optic fiber free ends are distributed through the many loops around the star bow.

Hence, the light emitted by the LED generates a small pinpoint of light at the end of every optic fiber to create an appealing illumination effect.

Another preferred embodiment of the invention presents an optic fiber icicle set with optic fiber illumination. The icicle set is provided as an elongated strand of wires (typically sheathed) from which main icicle branches depart. Each branch has in turn a plurality of branches. The main branch is a sheathed bundle of optic fibers. The ends of the fibers are distributed through the many branches of the icicle branch. An illumination source, preferably a LED (light-emitting diode), is fixed at the base of each icicle branch. Optic fibers consisting of an elongated body with two ends, a base end and an free end, are put into contact with the LED illumination at their base end in a way that the light emitted by the LED will enter the optic fiber. The optic fiber free ends are distributed through the many branches in the icicle branch. Hence, the light emitted by the LED generates a small pinpoint of light at the end of every optic fiber to create an appealing illumination effect in each icicle.

BRIEF DESCRIPTION OF THE DRAWINGS

Further features and advantages of the present invention will become apparent from the following detailed description, taken in combination with the appended drawings, in which:

FIG. 8 is a cross-sectional view of the casing of FIG. 6 with the battery engaged for illumination and the cover on the casing, the switch is not shown;

FIG. 10 is a side plan schematic view, partly cutout, of the icicle embodiment of the present invention.

It will be noted that throughout the appended drawings, like features are identified by like reference numerals.

DETAILED DESCRIPTION OF THE PREFERRED EMBODIMENTS

Figure 1:
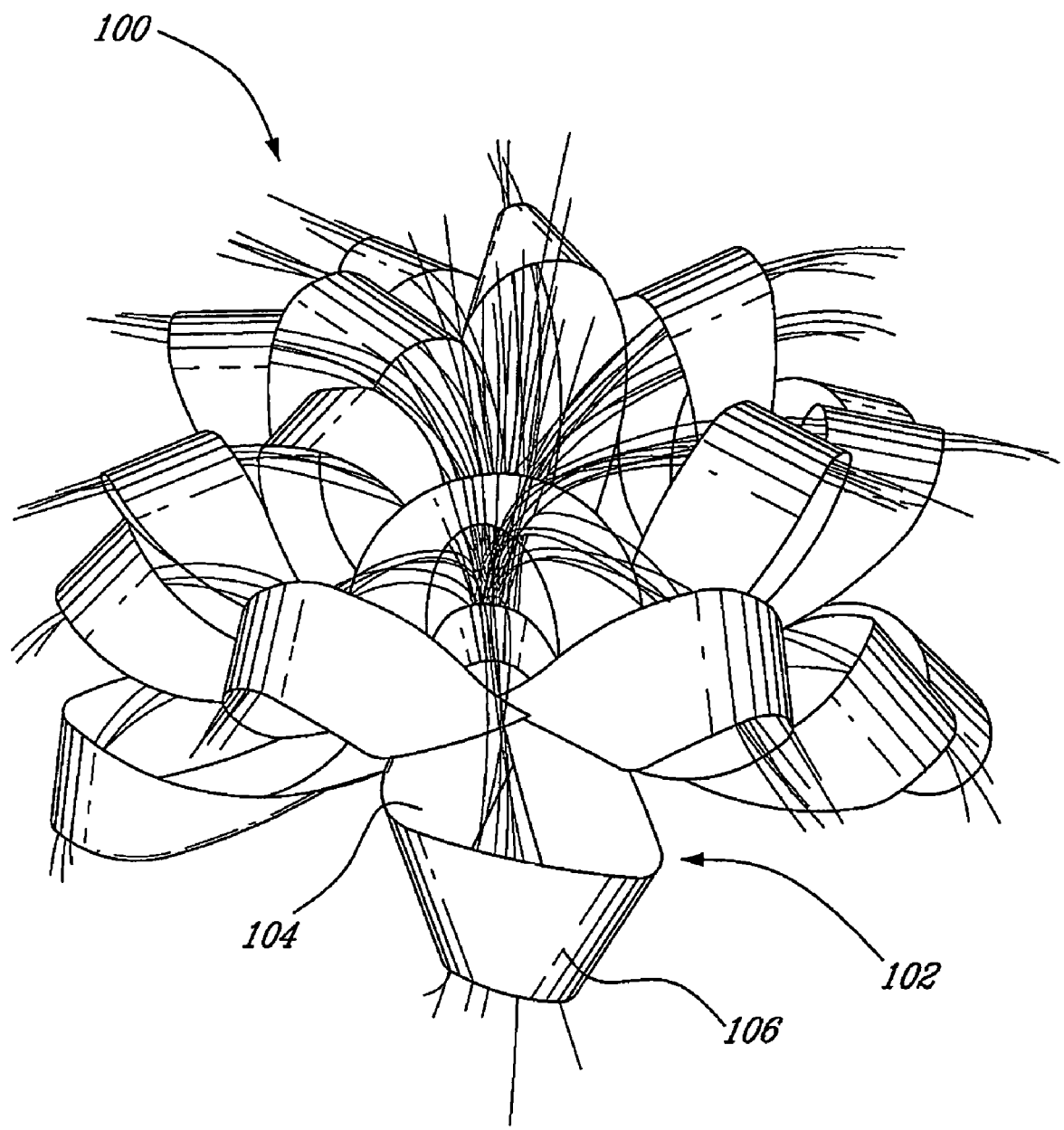
FIG. 1 is a perspective view of a star bow with optic fibers in accordance with an embodiment of the invention.
Figure 2:
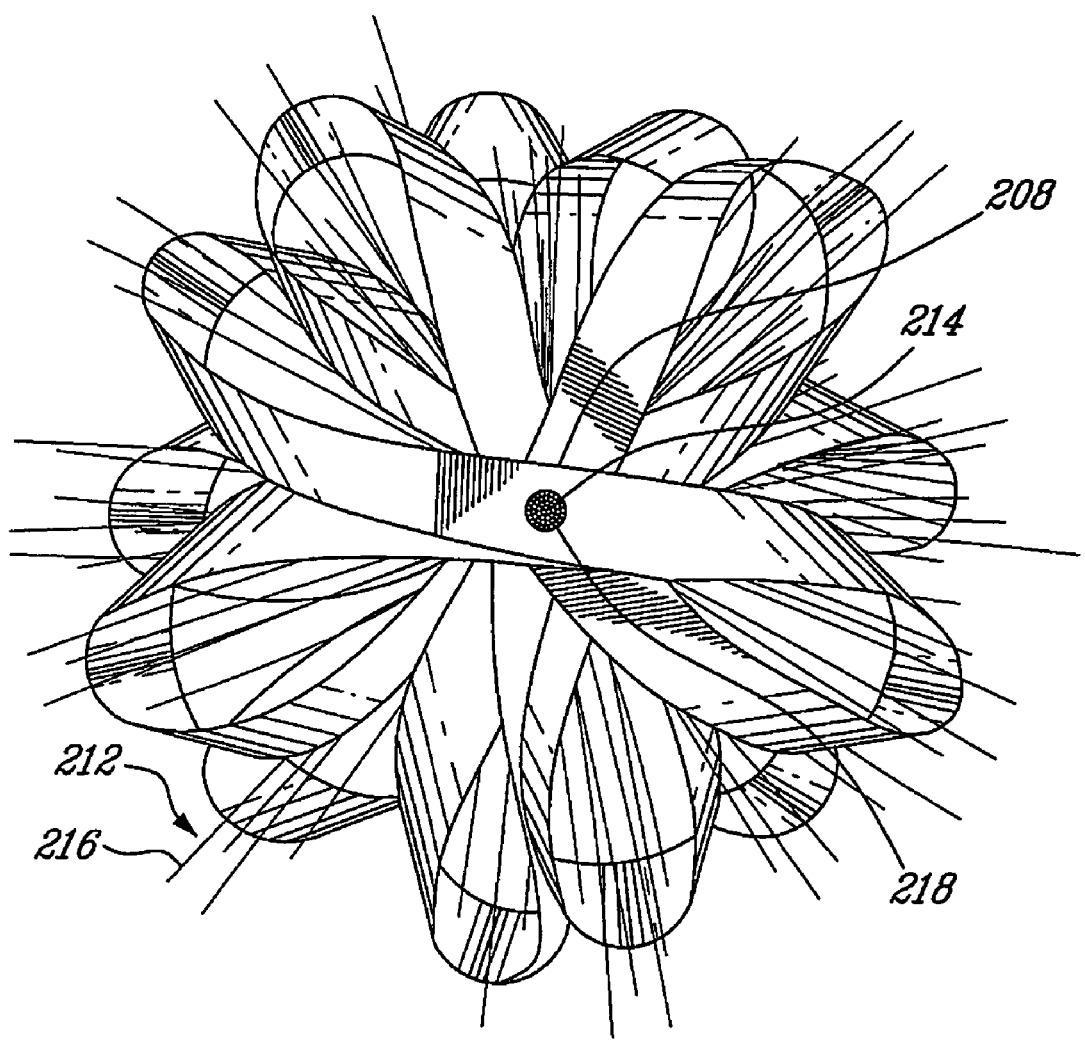
FIG. 2 is a bottom plan view of the star bow with optic fibers of the present invention.
Figure 3:
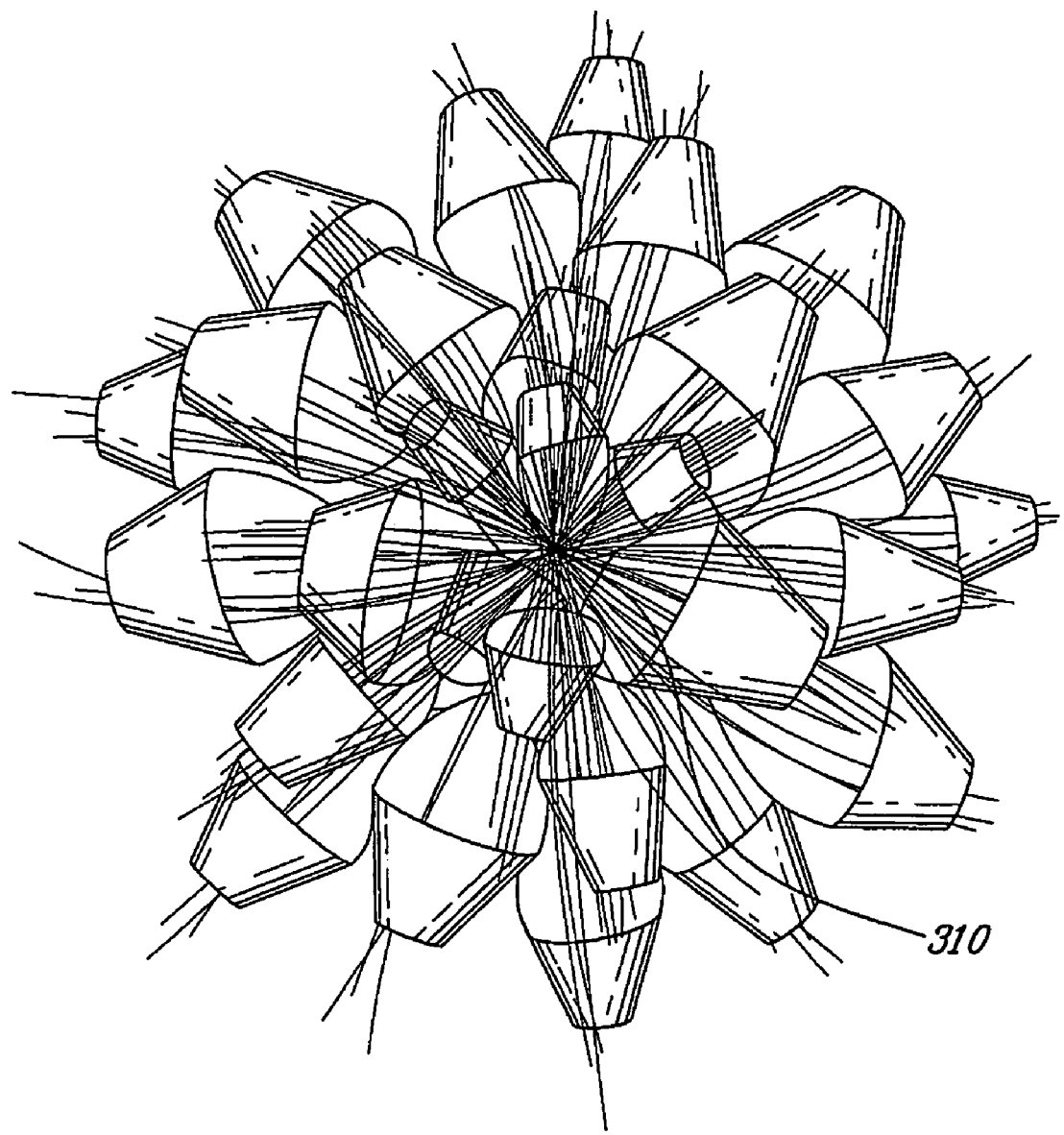
FIG. 3 is a top plan view of the star bow with optic fibers of the present invention.

A preferred embodiment of the optic fiber decorative item is an optic fiber star bow 100, and it is illustrated in FIGS. 1 to 3. The core portion of the optic fiber star bow is a standard star bow 102 consisting of a ribbon 104 which is twisted and turned in a predetermined configuration to create a plurality of loops 106. Each loop 106 is attached to the center of the bow 102 (specifically at its bottom) because the ribbon passes at this point between each loop, thus creating a base 208. The bottom of the bow is generally flat, although some bottom loops may fall below the plane created by the base 208. The loops are generally oriented in an upward fashion, giving the star bow volume, although the external loops are more laterally oriented. The loops are disposed in a generally circular manner around an axis 310 perpendicular to the base so that it creates a flower-head type arrangement.

The base 208 of the bow is more rigid than the loops due to the ribbon overlapping itself many times. This area is typically provided with an adhesive, in common star bows, so one may fix the star bow to a gift. The adhesive is typically a sticker with a protection sheet stapled to the base of the bow thereby ensuring that the loops keep their shape and the overall star shape of the star bow. Once the protection sheet removed, the bow can be affixed to the gift.

Since optic fibers are an integral part of the invention, discussion shall be made about them herein. An optic fiber 212 consists of an elongated and flexible strand of glass, constituting the body of the fiber, comprising two ends. It is well known in the art that light entering one end of an optic fiber will travel to the other end with very little loss of light intensity in the body. In the invention, a quantity of optic fibers are used, which are preferably of the "Top-Bright" type. Use of fibers having a 0.4 mm diameter is preferred. One end of each optic fiber is fixed in the region of the base, whereas the other end is preferably passed through a loop and may exceed the loop by a certain distance or may simply come out between loops. The end of the optic fiber which is fixed shall be called the "base end 214", whereas the other end shall be referred to herein as the "free end 216". Although the free ends of the optic fibers are distributed within the star bow, all base ends are joined side by side towards the base 208 to form a "stem" 218. Preferably, the base end of the optic fibers are surrounded by an outer shield, doing so may help bundling the base ends into a stem. As will be readily understood, the stem is typically centered about the axis of the bow 310. Some optic fibers may be shorter to create three dimensional texture throughout the bow, especially in its center. The preferred average length of the fibers, however, is of approximately 80 mm.

The optic fibers thereby visually complement the loops of ribbon to create a beautiful ornament.

Figure 4:
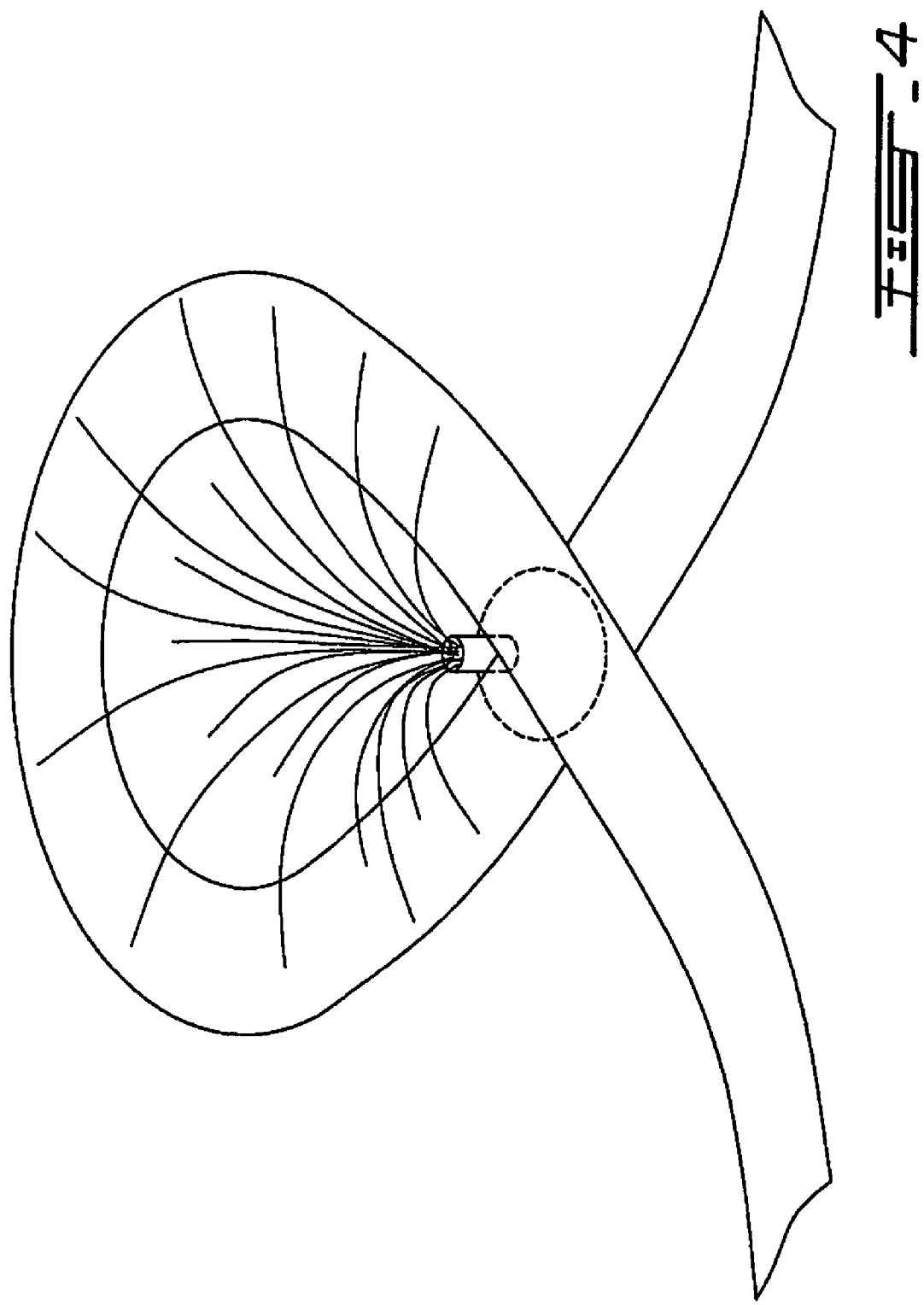
FIG. 4 is a top plan view of an illuminated simple loop of ribbon in accordance with an other embodiment of the invention.

Other embodiments of decorations use other bow and ribbon shapes. For example, FIG. 4 shows an embodiment of the invention wherein the bow is not a star bow, but a simple twisted ribbon with only one intersection.

Figure 5:
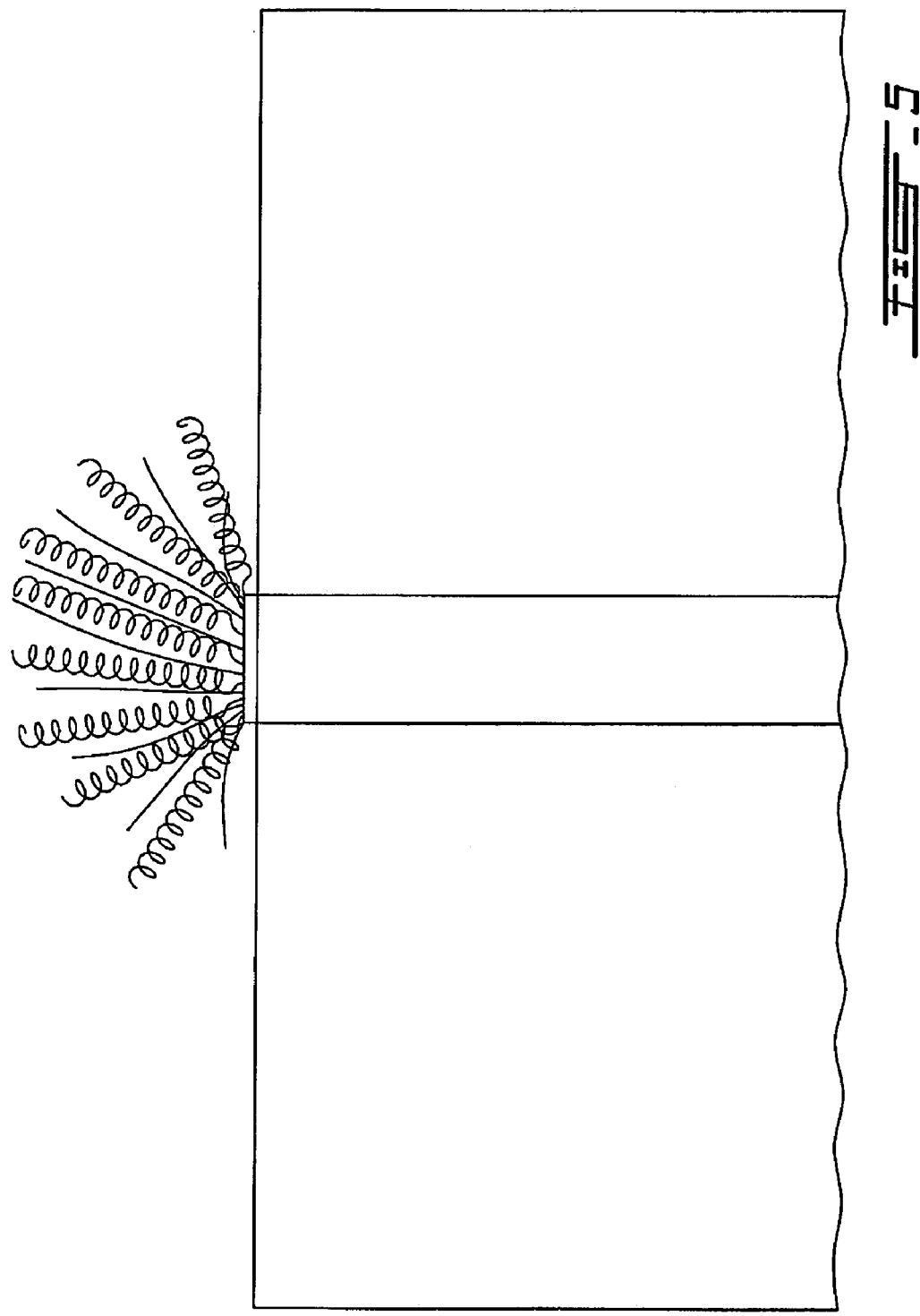
FIG. 5 is a side view of an illuminated bundle of curled ribbons, in accordance with an other embodiment of the invention.

FIG. 5 shows another embodiment wherein the fibers are distributed in a bow made of a multitude of spiraled (curled) ribbons tied together at a base and bundled in a stem at their lower end. The free ends of the spiraled ribbons alternate and are mixed with the free ends of the optic fibers.

Figure 6:
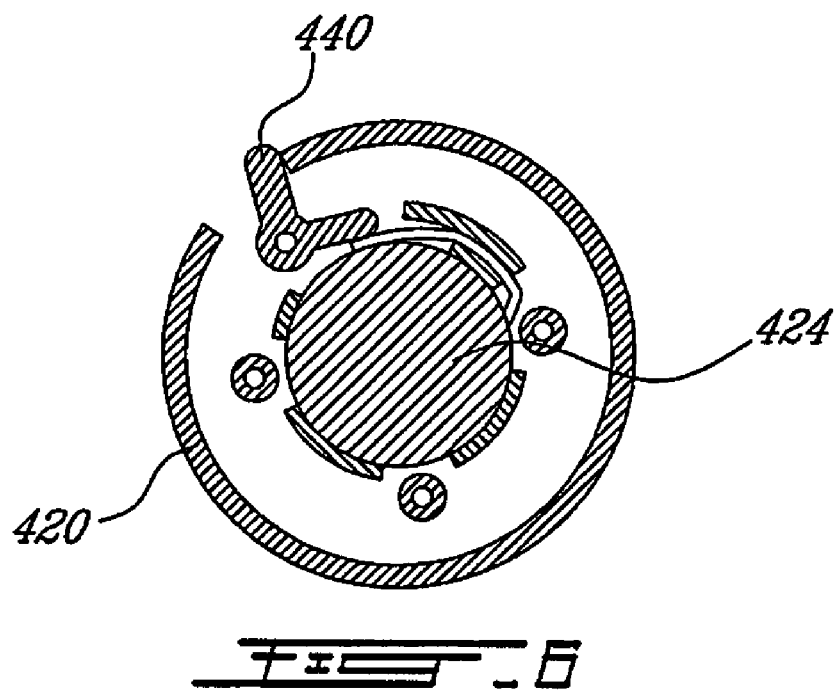
FIG. 6 is a bottom plan view of the casing containing the electronics necessary to illuminate the fiber optics, with the cover removed, the battery engaged for illumination and the switch in the "on" position.
Figure 7:
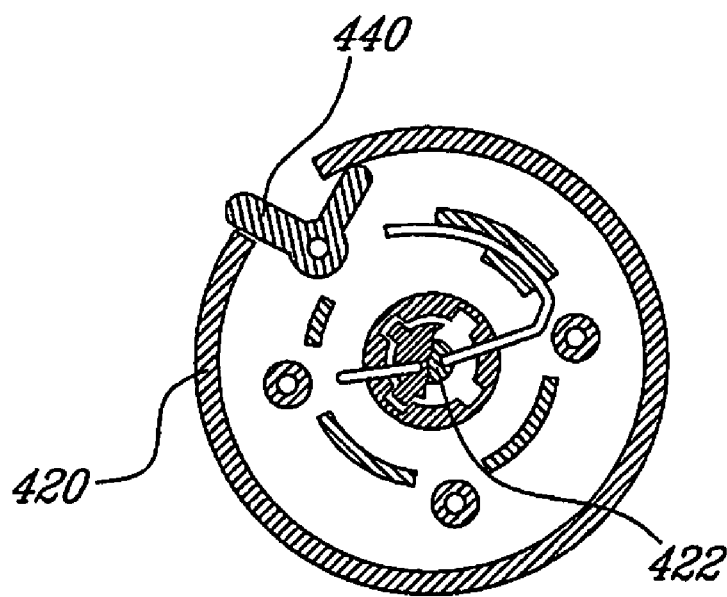
FIG. 7 is a bottom plan view of the casing of FIG. 6 with the cover removed, the battery removed and the switch in the "off" position.

With reference to FIG. 6, FIG. 7 and FIG. 8, a circuit housing 420 (circuit housing and circuit housing internal components are not shown in FIG. 2) is installed at the base. The circuit housing has several functions, one of them is to provide a location for a light source 422 and an energy source 424 to supply energy to the light source, a second one is to provide a seat 426 for the optic fiber stem 418, and a third is that the bottom of the circuit housing is affixed with an adhesive 428 for fixing the optic fiber star bow to a surface.

As shown in FIG. 8, the stem 418 is inserted and fixed into the circuit housing 420 above the light source 422 so a single light source may introduce light into every optic fiber present in the star bow. Even though the light source and the stem are separated by space 430, light will propagate in the air and reach the base ends of the optic fibers. The light source 422 is connected to the energy source 424 using two wires.

In the preferred embodiment, the base end of the optic fibers will be oriented in the direction of the light source and will be held in place to permit the entry of light in the body of the fiber. When the light source is activated, it draws energy from the energy source and emits light. Light thus enters the base end of the fibers 414, travels inside the optic fibers, and exits at the free end, thus emitting a pinpoint of light at the free end. Since a number of optic fibers are used, and most of their free ends are held into place by the loops they pass through, pinpoints of light are found in many places of the optic fiber star bow thus creating a beautiful illumination effect.

For the embodiment of FIG. 4, the circuit housing is placed under the intersection of the ribbon. The light source is preferably oriented so that it will emit light laterally to the bow instead of perpendicularly as in FIG. 8.

Preferably, the circuit housing is a housing of the size of 3.5 cm in diameter, centered about the axis of the stem 418 and of about 1 cm height. As will be readily understood, any miniaturization of the circuitry housed within the circuit housing could allow hiding the circuit housing within the bow, closer to the stem and the base of the bow.

The light source preferably used is a LED (light emitting diode) because of its low energy consumption and high illumination output. LED's only need a small energy source. Because of their low current draw, LED's use up the energy of an energy source slowly and therefore permit the energy source to last for a long time. The preferred energy source to be used is a small battery which is also fitted in the circuit housing at the base of the star bow. The type and size of LEDs that have been found to provide the most satisfactory appearance were the "Dip" type, of a 3 mm diameter.

The energy source is a battery. It is preferably a lithium 3V battery model CR2016 which lasts 22 to 24 hours. Its negative electrode touches the bottom of the housing and is grounded. Its positive electrode is made to electrically connect to the power input of the light source. A power switch 440 controls the activation of the light source by controlling the contact made by the electrical connection to the power input of the light source.

It would be possible to omit the switch 440. The decoration would then be provided with a removable cover for the casing and the battery would be provided separately. When the user would want the decoration to be illuminated, he would simply remove the cover, insert the battery and close the cover, thereby making the electrical connection to the power input of the light source and illuminating the decoration. Even if the casing is provided with a switch 440, the casing could still have a removable cover, as shown in FIG. 6 to 8 to allow replacement of the battery.

Figure 9A:
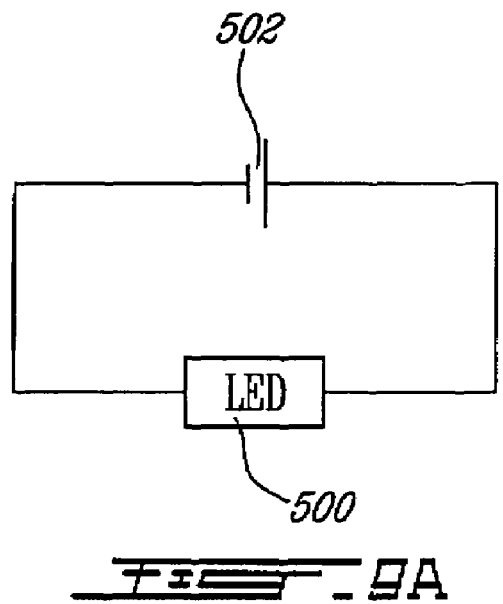
FIG. 9 comprises FIG. 9A and FIG. 9B which are block diagrams of the main components necessary to illuminate the fiber optics and, optionally, emit sounds.
Figure 9B:
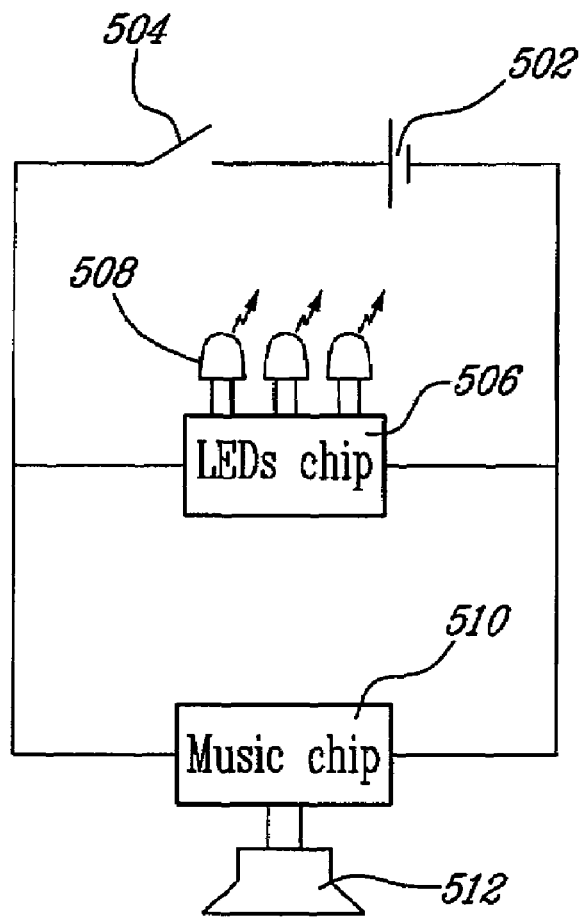

FIG. 9 shows a possible embodiment of the illumination circuitry. In FIG. 9A, a simple LED 500 can be powered by an energy source 502. The illumination is therefore constant throughout the life of the battery. In FIG. 9B, a plurality of LED's 508 are provided within the housing and are controlled by a small controller 506 which can be powered on or off by the switch 504. The LED's could have different colors or could have different lighting schemes, for example, a pulsating light, a constant light and a differently colored light.

Optionally, sounds may be emitted by the decoration item using a music chip 510 and a speaker 512. As will be readily understood, a separate switch (not shown) could be provided for the sound emitting circuitry in case one wishes to only use the illumination portion of the decoration.

Activation of the illumination of the bow can be done in various other ways depending on the circuit housing construction. The circuit housing can be made such that the user presses the bottom of the circuit housing of the bow, which moves the battery (pool of batteries) into contact with the LED via electrical conduction means. In this embodiment, there is no way of stopping the illumination, which continues until the battery is empty.

In other embodiments, there are provided means to interrupt the current input to the LED so one can use the star bow in a plurality of separate instances over time. This embodiment provides a switch as an interrupter. The switch is used to activate the illumination, but may also be used to deactivate the illumination, or turn the star bow "off", in order to conserve energy for reusing the bow in another occasion.

In still further embodiments, the circuit housing is provided with a panel for battery access thereby allowing to replace the batteries once emptied and reuse the bow.

Depending on the type of LED's and filters used, the illumination pattern can be varied. When a single LED of a particular color or a LED emitting a white light is used with a single colored filter, the light emitting from the free ends of the optic fibers will be of one color. When a white light LED is used in conjunction with a rotating filter bearing a plurality of colors, the light emitted can vary in color over time. The motor required to rotate the filter can be powered by the same energy source. Still another embodiment would permit the use of several light sources instead of just one, or a color varying light source. This would permit the star bow illumination to be of several colors.

It is also possible to provide additional circuitry in order to permit variation of the light emission intensity instead of having only a continuous illumination. Such a circuitry will permit a cyclic, or random, variation of the light intensity at the light source. Of course, this will create a variation of light intensity at the free end of the optic fibers.

In a preferred embodiment, the programmable multifunctional 3-LED assembly comprises an internal chip 506 and three light emitting diodes (LED) 508 of different colors, i.e. red, green and blue. When the circuit is switched on, a mixed-color sequence begins. Each of the LEDs is turned on and off at different times such that at some times the three LEDs are on together or two LEDs are on together or a single LED is on. Next, there is a flashing sequence wherein the LEDs flash alternatively in groups of two or three. When the circuit is switched on, the mixed-color sequence and the flashing sequence follow one another for a minimum period of thirty hours. This 3-LED circuit is energized with a 3-volt SC4 lithium battery CR-2016.

When switched on, the 3-LED assembly is controlled to perform a mixed-color sequence and a flashing sequence repeated 5 times. This is repeated continuously.

The mixed-color sequence could be as follows: blue, red and green turn on, red turns off, green turns off, blue turns off, red and green turn on together, green turns off, red turns on, green and blue turn on, green turns off, blue turns off, red and green turn on, red and green turn off, red turns on progressively, green and blue turn on, red turns off, green turns off, blue turns off.

The flashing sequence could be as follows: red, green and blue flash together four times, red and green flash together, blue and green flash together and red and blue flash together.

As will be readily understood, the decorative item, such as the bow and the ribbon with optic fibers, can be sold assembled with the illumination circuitry and ready-to-use or can be provided separately from the illumination circuitry for assembly by the user. This could allow re-use of a decorative item with a plurality of illumination circuitries, each potentially having a different lighting scheme and/or color scheme and re-use of an illumination circuitry with different types of decorative items, such as a star bow, a bow and a bundle of spiraled ribbons. For example, a Christmas time themed illumination circuitry would alternate between red and green lighting of the decorative item while a kid birthday themed illumination circuitry would have a brightly colored illumination scheme provided in a child's favorite color. Similarly, a 50$^{th}$ anniversary themed illumination circuitry would have a lighting scheme of slow alternating soft gold and silver colors. Some illumination circuitries could be provided with a on/off switch, others not, etc. The user would simply buy one decorative item and an appropriate illumination circuitry and assemble the two by, for example, inserting the stem of the optic fibers within an opening provided in the circuit housing, thereby causing an electrical connection between the light source and the energy source and an alignment of the base ends of the fibers with the light source for proper use of the assembled decorative item.

In another embodiment of the present invention, the decoration is an icicle set, typically used at Christmas, to decorate one's home. The optic fiber icicle set of the present invention has optic fiber illumination. The icicle set is provided as an elongated strand of wires (typically sheathed) from which main icicle branches depart. Each branch has in turn a plurality of branches. The main branch is a sheathed bundle of optic fibers. The ends of the fibers are distributed through the many branches of the icicle branch. An illumination source, preferably a LED (light-emitting diode), is fixed at the base of each icicle branch. Optic fibers consisting of an elongated body with two ends, a base end and an free end, are put into contact with the LED illumination at their base end in a way that the light emitted by the LED will enter the optic fiber. The optic fiber free ends are distributed through the many branches in the icicle branch. Hence, the light emitted by the LED generates a small pinpoint of light at the end of every optic fiber to create an appealing illumination effect in each icicle.

The preferred icicle set is shown in FIG. 10. A connector for an energy source 600 ensures that energy will be provided in wire 602, typically sheathed although the sheath is not shown. Wire 602 can in fact be a strand of multiple wires and is the stem of the icicle set. Each icicle branch 622 is attached to the stem and is adapted to receive energy from the wires in the stem. Typically, the stem will be straight although flexible and the branches will all depart from the stem on the same side so that when the stem is attached to a window of a house, all icicle branches will drop from the stem in the same general direction.

Each branch 622 has a casing 604 in which the illumination circuitry 608 is provided together with the illumination source 610 and the seat 612 for the fiber optics ends. The circuitry can be very similar to that explained earlier except that the energy source will typically be power from a household power line instead of individual batteries. A LED chip or controller may be programmed in a similar fashion to that explained earlier. From the casing exits at least one bundle of fibers. Five sheathed bundles 614 can exit from the casing, each containing at least one optic fiber. Preferably, each bundle 614 contains at least five optic fibers. The bundles are made so that they have different lengths and are oriented in different directions to create a repartition of illumination. The fiber optic free ends 616 exit at the end of the bundle. If only one bundle exits the casing, such as shown with bundle 618, the sheathing of the bundle creates smaller branches 620 departing from the main icicle branch exiting from the casing. The fiber optics are distributed within the smaller branches, to create a repartition of illumination.

As will be readily understood by one skilled in the art, the icicles could have any shape, any number of branches or any number of optic fibers exiting the sheath. The length of the optic fiber ends made to exit the sheath could vary to create an illumination pattern.

Typically, the fiber optic icicle set of the present invention could be made to mimic the prior art icicle sets by having the same lengths for the branches. For example, the stem would measure eight feet from the first to the last icicle branch or drop. Each alternate icicle branch could have smaller branches 620 or bundles 614 of lengths of 11.5, 14.5, 18, 21.5 and 24 inches (from the stem). The other alternate icicle branch would have only three branches or bundles of lengths of 13, 16 and 20 inches (from the stem).

The embodiments of the invention described above are intended to be exemplary only. The scope of the invention is therefore intended to be limited solely by the scope of the appended claims.

What is claimed is:

1. An illuminated decorative item, the item comprising: a decorative body created with at least one elongated strip of ribbon, said body having a base; a light source disposed at said base; an energy source electrically connected to said light source to supply energy to said light source; and at least one optic fiber, each optic fiber comprising an elongated body having a base end and a free end, said base end being close to and oriented towards said light source, said free end being arranged to visually complement said decorative body; wherein said energy source supplies energy to said light source, at least some light emitted by said light source enters said optic fiber at said base end, propagates inside the optic fiber, and exits from the free end thus generating an illumination at the free end and creating a illumination effect for said decorative item, said decorative body being a star bow made of said ribbon twisted and turned to define a plurality of loops disposed in a generally circular manner around a central axis and defining a generally flat base where said ribbon overlaps a number of times between said loops.

2. An illuminated decorative item as claimed in claim 1, further comprising a switch for controlling said supply of energy to said light source.

3. An illuminated decorative item as claimed in claim 1, wherein said free end is inserted in one of said loops.

4. An illuminated decorative item as claimed in claim 1, wherein said light source is a light-emitting diode (LED).

5. An illuminated decorative item as claimed in claim 1, wherein said energy source is a battery.

6. An illuminated decorative item as claimed in claim 1, further comprising a circuit housing provided at said base for receiving said base end of said optic fibers and housing said light source.

7. An illuminated decorative item as claimed in claim 1, wherein said ribbon is made of one of transparent and semitransparent material.

8. An illuminated decorative item as claimed in claim 1, further comprising a color filter for modifying a color of said emitted light.

9. An illuminated decorative item as claimed in claim 1, further comprising an intensity modulator for modifying an intensity of said emitted light.

10. A decorative item made of ribbon, the item comprising: a decorative body created with at least one piece of said ribbon, said body having a base; at least one optic fiber, each optic fiber comprising an elongated body having a base end and a free end, said base end being close to said base end, said free end being arranged to visually complement said decorative body, wherein said decorative body is a star bow made of said ribbon twisted and turned to define a plurality of loops disposed in a generally circular manner around a central axis and defining a generally flat base where said ribbon overlaps a number of times between said loops, wherein said free end of said optic fiber is inserted in one of said loops.

11. An illumination circuitry for a decorative item made of ribbon, the item having a decorative body created with at least one piece of said ribbon, said body having a base and at least one optic fiber, each optic fiber comprising an elongated body having a base end and a free end, said base end being close to said base end, said free end being arranged to visually complement said decorative body, the illumination circuitry comprising: a light source substantially aligned with said base ends; and an energy source electrically connected to said fight source to supply energy to said light source; wherein said illumination circuitry is adapted to be disposed at said base thereby ensuring that when said energy source supplies energy to said light source, at least some light emitted by said fight source enters said optic fiber at said base end, propagates inside the optic fiber, and exits from the free end thus generating an illumination at the free end and creating a illumination effect for said decorative item, said decorative body being a star bow made of said ribbon twisted and turned to define a plurality of loops disposed in a generally circular manner around a central axis and defining a generally flat base where said ribbon overlaps a number of times between said loops, wherein said free end of said optic fiber is inserted in one of said loops.

12. An illumination circuitry as claimed in claim 11, further comprising a switch for controlling said supply of energy to said light source.

13. An illumination circuitry as claimed in claim 11, further comprising a circuit housing for receiving said base end of said optic fibers and housing said light source and said energy source.

* * * * *